United States Patent [19]
Devin

[11] Patent Number: 6,060,932
[45] Date of Patent: May 9, 2000

[54] VARIABLE FREQUENCY CHARGE PUMP

[75] Inventor: Jean Devin, Aix-en-Provence, France

[73] Assignee: STMicroelectronics S.A., Gentilly, France

[21] Appl. No.: 09/118,953

[22] Filed: Jul. 17, 1998

[30] Foreign Application Priority Data

Jul. 18, 1997 [FR] France .................................. 9709145

[51] Int. Cl.⁷ ...................................................... G06F 1/04
[52] U.S. Cl. .......................................... 327/298; 327/299
[58] Field of Search ................................... 327/291, 296, 327/298, 292, 299, 536

[56] References Cited

U.S. PATENT DOCUMENTS

| | | | |
|---|---|---|---|
| 5,018,168 | 5/1991 | Matsuoka | 375/106 |
| 5,483,185 | 1/1996 | Scriber et al. | 327/298 |
| 5,506,545 | 4/1996 | Andrea | 331/78 |
| 5,530,390 | 6/1996 | Russell | 327/164 |
| 5,561,385 | 10/1996 | Choi | 327/536 |
| 5,821,781 | 10/1998 | Rigazio | 327/298 |
| 5,923,197 | 7/1999 | Arkin | 327/262 |

FOREIGN PATENT DOCUMENTS

| | | |
|---|---|---|
| 0772200A1 | 5/1997 | European Pat. Off. . |
| 2724468 | 3/1996 | France . |
| 08106790A | 4/1996 | Japan . |

OTHER PUBLICATIONS

Patent Abstracts of Japan, vol. 11, No. 165 (E–510), May 27, 1987, JP 61 295866 (Matsushita Electric Works).

*Primary Examiner*—Jung Ho Kim
*Attorney, Agent, or Firm*—Theodore E. Galanthay; Allen, Dyer, Doppelt, Milbrath & Gilchrist, P.A.

[57] ABSTRACT

In integrated circuits, to modify the operation of the charge pumps or voltage step-up circuits, they are sent a variable frequency signal at the input with the aim of breaking the regularity of the pulse train that enters the charge pump. This limits the risks of entry into resonance and limits radiation at a given frequency. The variable frequency signal is typically produced by a logic circuit and by a main oscillator whose transmission of certain pulses is masked by the combined action of different masking signals. The duty cycle ratios of the masking signals are less than that of the signal from the main oscillator. Such duty cycle ratios are preferably produced following the passage of a signal to a lower frequency than that of the signal of the main oscillator in a circuit for the detection of high transitions.

26 Claims, 2 Drawing Sheets

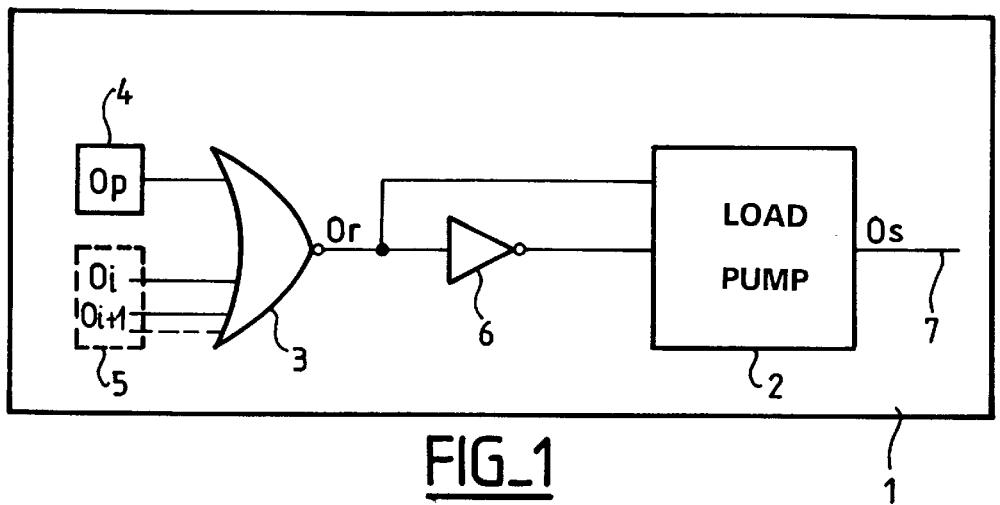
FIG_1
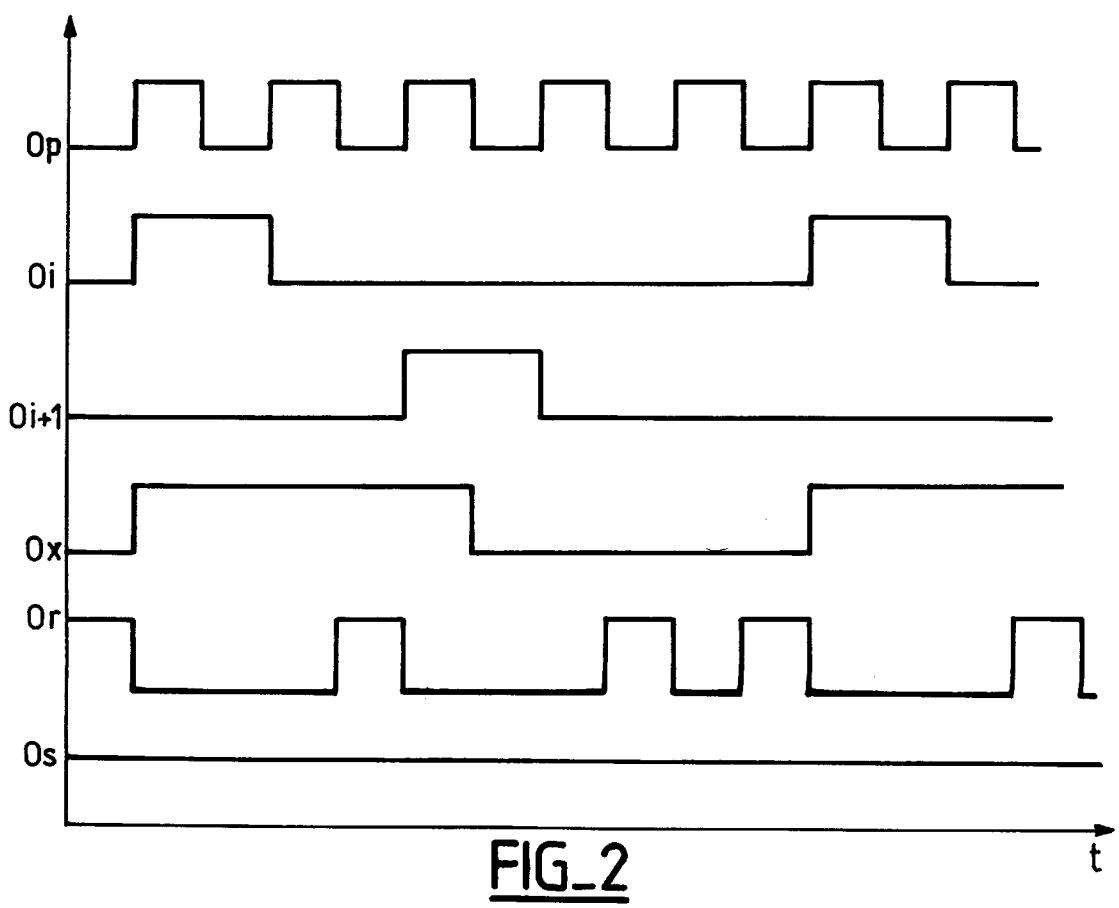
FIG_2

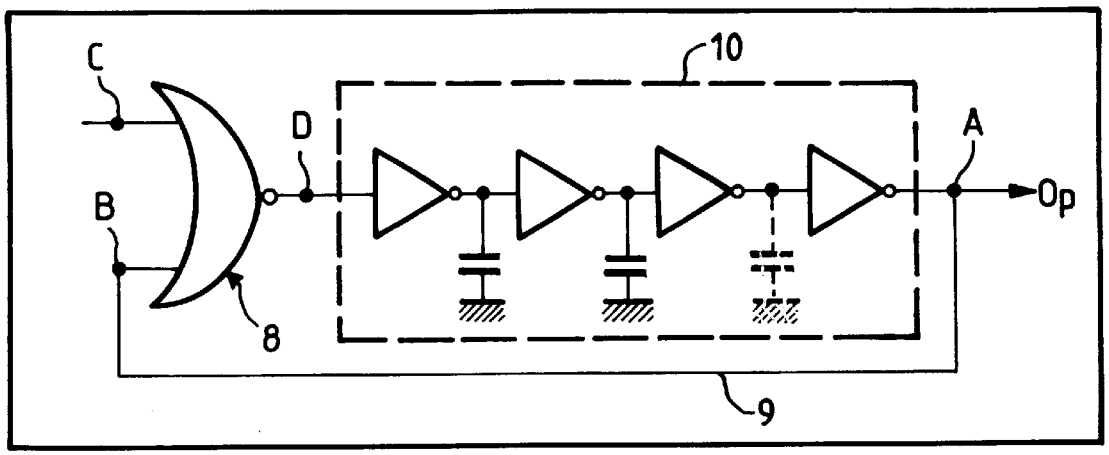
FIG_3
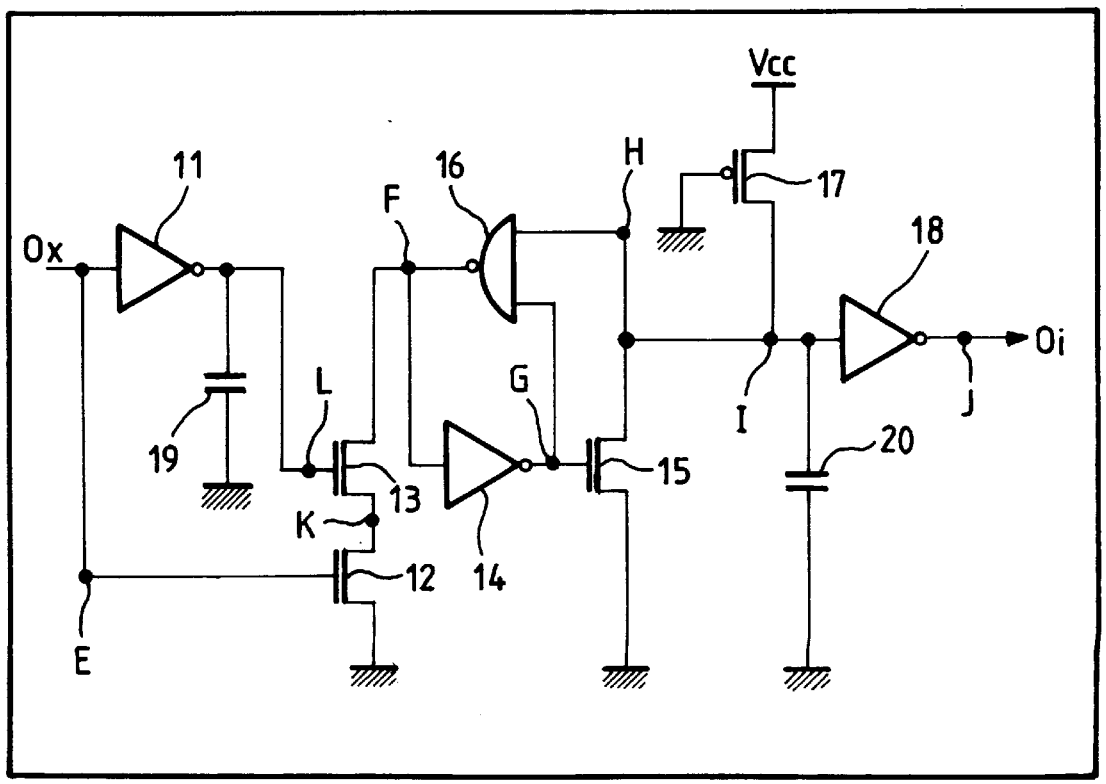
FIG_4

VARIABLE FREQUENCY CHARGE PUMP

FIELD OF THE INVENTION

The invention relates to circuits conventionally known as charge pumps or voltage boosters. These circuits can be used for producing a higher voltage from a given voltage.

BACKGROUND OF THE INVENTION

Voltage booster circuits are commonly used and typically comprise a plurality of stages. A basic booster or booster stage uses switches, two capacitors and a two-phase clock to actuate the switches. First, a first capacitor is charged at a voltage Vcc, for example, 5 volts, and then it is discharged into the second capacitor. A second cycle then begins which includes a first step of charging the capacitor at Vcc and then a second step of discharging the first capacitor into the second capacitor (which is already partially charged). Thus, the voltage at the terminals of the second capacitor increases at each clock pulse. Multiple-stage charge pumps are used with complementary switching circuits, and the boosted voltage Vpp then increases to a voltage greater than the supply voltage Vcc.

This principle is commonly used in integrated circuits, especially for electrically programmable memories comprising a floating-gate transistor as a storage element, EEPROM-type memories or EPROM-type memories, depending on whether these memories are electrically erasable or not. The principle may also be used in flash EPROMs when they are block-erasable.

Indeed, in certain memories, the programming voltage Vpp may be supplied by an external supply. However, this then necessitates a specific additional supply pin for the integrated circuit. The additional pins add to the cost of the integrated circuits and it is preferred to avoid them. In certain applications, it is even possible to have no external supply for the programming voltage (for example, in a chip card with a chip having four useful terminals wherein there are no pins or terminals for the programming voltage) and there is no ability to add a terminal. In other applications, it may be that there is no external supply pin at all (for example, in contactless chip cards whose operating power and interfacing are provided by electromagnetic means).

This is why memories in integrated circuit form have been proposed wherein the programming voltage Vpp is produced within the integrated circuit itself from the normal supply voltage Vcc. For reasons of security, it may be preferable, especially in the field of chip cards, to leave the production of the programming voltage under the control of the integrated circuit itself. In this way, fraudulent individuals are not offered the facility of an additional terminal by which this programming voltage could be applied to the circuit and with which they would enjoy an additional means to alter the circuit.

Conventionally, a charge pump or load pump works with an input signal at a switching frequency f. The effects of this switching signal include the generation of switching noise within the voltage booster circuit. This noise increases with the level of the voltage Vpp to be produced and with the number of stages.

The level of output voltage from the step-up circuit, available at a capacitor, is kept at a fixed value by a regulator. This regulator may include a sequence of transistors mounted as diodes so that each transistor sets up a voltage equal to its threshold voltage between its source and its drain. Depending on the technology implemented, the threshold voltage varies, and the number of series-connected transistors is used to define the regulated voltage at the output of the regulator. For example, with transistors having a threshold voltage of about 1 volt, there should be 16 transistors to produce a regulated voltage Vpp on the order of 16 volts.

A charge pump is therefore controlled by an oscillator producing cyclically repetitive pulses that it uses as control signals. Two phenomena then arise; with the first being an amplification of the noise by a resonance phenomenon linked to the control frequency of the charge pump. This noise disturbs the operation of the rest of the integrated circuit. Furthermore, the charge pump itself, with its fixed frequency, could undesirably more easily enter into a state of oscillation induced by a regular external signal.

Furthermore, the electromagnetic radiation induced by the integrated circuit may be undesirable to expose to humans. This is the case for example in portable telephone sets especially GSM (Global System for Mobile Communications) telephone sets which are held close to the user's ear.

SUMMARY OF THE INVENTION

The invention, therefore, to resolve these problems, relates to a charge pump controlled by a variable frequency. According to the invention, there is then little chance of going into resonance. Since the frequency is not fixed, there is furthermore a reduction in potential health affects which may be related to the frequency. It is of course true that a regular signal produced by a main oscillator will remain, but its effect, according to the invention, will appear on a limited circuit portion located before or upstream of the charge pump, hence, before the high-voltage signals whose electromagnetic radiation is greater.

An object of the invention, therefore, is an electronic integrated circuit comprising a charge pump and at least one first oscillator to produce cyclically repetitive pulses used as control signals for the charge pump. The electronic integrated circuit comprises a circuit to mask the transmission of certain pulses to the charge pump, and, accordingly, modify the frequency of electromagnetic radiation induced by these pulses.

BRIEF DESCRIPTION OF THE DRAWINGS

The invention will be understood more clearly from the following description and from the appended figures. These figures are given purely by way of an indication and in no way restrict the scope of the invention. Of these figures:

FIG. 1 shows a schematic drawing of the generation, according to the invention, of a variable frequency signal at the input of a charge pump which is also shown;

FIG. 2 shows different timing diagrams of the signals from different oscillators that are used in the circuit of the invention, as well as a timing diagram of a control signal for the charge pump;

FIG. 3 shows a standard ring oscillator that can be used in accordance with the invention; and FIG. 4 is a diagram of a circuit used to detect high-level transitions in accordance with the invention.

DETAILED DESCRIPTION OF THE PREFERRED EMBODIMENTS

FIG. 1 shows an integrated circuit 1 comprising a load or charge pump 2 and at least one first oscillator 4. The oscillator 4 produces a signal Op comprising cyclical repetitive pulses. It is possible, in particular, to use signals with cyclical or duty cycle ratios of 50% and at a frequency of, for example, 5 MHZ. The signal Op produced by the oscillator 4 is shown in FIG. 2. According to an important characteristic of the invention, the circuit 1 has a mask circuit 3 interposed between the oscillator 4 and the load pump 2.

This mask circuit 3 is designed to mask the transmission of some of the pulses of the signal Op. Consequently, FIG. 1 shows the principle of the generation of a signal Or with variable frequency. The signal Or is the control signal for the load or charge pump 2. The charge pump 2 gives rise to a high voltage signal Os available at its output 7. The signals Or and Os are also shown in FIG. 2.

For practical reasons, the signal Or is sometimes passed through an inverter 6 which produces a signal that is complementary to the signal Or. The signal Or and its complementary signal are applied to the control inputs of the charge pump 2.

In one example, this variable frequency signal Or may quite simply be recovered at the output of a NOR gate 3. It is nevertheless possible to provide for circuits other than a NOR gate. This gate, for example, has the advantage of leading to a very simple circuit. For this purpose, the following signals are applied to the different inputs of this NOR gate 3:

the signal Op produced by the first oscillator 4. The signal Op is provided by cyclically repetitive pulses. This oscillator 4 therefore sends out a signal with a fixed frequency;

one or more signals produced by one or more other oscillators 5. The signals of these oscillators are referenced Oi, and possibly Oi+1, and have a frequency lower than that of the signal Op.

The signals Oi, Oi+1 are applied to the input of the NOR logic gate 3. It has the role of a combination circuit which will combine the signals of the two oscillators. The signals Oi, Oi+1 will mask the transmission of a part of the pulses of the signal Op. Certain pulses of Op are thus not transmitted. In fact, there is an output pulse at the output of the NOR gate 3 only if the input signals Op, Oi and Oi+1 present are all at zero. Thus, the regularity of the initial pulse train of Op is broken. The frequency of the output signal from the NOR gate is thus no longer constant. In other words, the NOR gate inverts the signal Op when all the other signals are at zero.

The masking signals Oi, Oi+1 may all be produced from one and the same signal Ox as shall be explained further below. The signal Ox, in the example, is at a lower frequency than the signal Op. In the example, the signal Ox has a cyclical ratio in the range of 50%. In fact, its cyclical ratio is of little importance.

The characteristic timing diagrams of the signals that are used are shown in FIG. 2. This figure thus shows the main oscillating signal Op which includes cyclically repetitive pulses. The order of magnitude of the frequency of Op is 1 to 20 MHZ. However, since an aim of the invention is to present an overall principle, it is necessary to be very flexible in considering the magnitudes of the different entities that are used in the description as will be appreciated by those skilled in the art.

The signal Oi is a signal with a cyclical ratio far below 50%, for example 10–15%. The signal Oi+1 is of the same type as the signal Oi. It is possible to pass from the signal Oi to the signal Oi+1, for example, by the passage of the signal Oi into a simple delay line. The signal Oi+1 is thus phase-shifted with respect to the signal Oi.

Preferably, the masking signals coming from the oscillator 5 must be synchronized with Op. To this end, they show leading edges or trailing edges only when Op has a leading edge or a trailing edge. This has the effect of not modifying the nature and, more specifically, the width of the pulses of the signal Or so as not to disturb the working of the load or charge pump.

To mask only some pulses of the signal Op, the circuit in accordance with the invention preferably uses signals Oi, and Oi+1 with a lower frequency than that of the signal Op and with a pulse width that is typically at least twice the pulse width of Op. Indeed, if the duty cycle ratios of the signals Oi and Oi+1 are close to that of the signal Op, the signal Or will undergo excessive deterioration. A deteriorated signal Op causes the malfunctioning of the charge pump. The mask Oi will, therefore, typically be slower than Op by at least one order of magnitude. The resultant timing diagram of the signal Or is shown in FIG. 2. It is this signal Or that will be fed into the charge pump.

FIG. 3 shows a standard ring oscillator that produces the signal Op. It is provided by an even number of series-connected inverters looped back from its output at the node A by a connection 9 to an input, namely the node B of a NOR logic gate 8. The NOR gate 8, at its other input, namely the node C, receives a control signal CMD which activates it or does not activate it. The output of the NOR gate 8 is the node D. The series of inverters forms a delay circuit 10. Since the transfer time of an inverter gate or an inverter is about 200 ps, with five inverters there would be an oscillation of 1 ns giving a frequency of 1 GHz—perhaps far too rapid for the applications envisaged. Thus, capacitors, for example capacitors of about 10 pf, are added. These capacitors are parallel-connected between the outputs of the inverters and ground. When associated with input impedances of the inverters with values of about 10 kΩ, we then have a delay of 100 ns, giving a signal frequency on the order of 10 MHZ.

The working of this ring oscillator from a logic point of view is as follows. The ring oscillator works in the low control position. C is at the state 0. Let it be imagined that the state of A is at 1. The state of B, connected to A solely by the return connection 9 is also at 1. Since B is at 1, the NOR gate 8 will automatically take D to the state 0. Hence A, after a delay, gets taken to the state 0, and therefore so does B. This state 0 gets propagated, the entire circuit switches over and a new cycle starts. Then, at A, an oscillation with a duty cycle ratio of 50% will be obtained. Its frequency depends on the number of inverters, as well as the number and value of the capacitors of the circuit portion 10. The present ring oscillator therefore works in a low control position.

To obtain Ox, it is possible to use the same principle, namely a ring oscillator with, however, far higher values of capacitance. Then, a lower frequency signal than that of Op is reached, but always with a duty cycle ratio of about 50%. Now, the duty cycle ratio, for the masks Oi and Oi+1, must be on the order of 10% so as not to cause excessive deterioration in the signal Or. A non-restrictive approach proposed to produce the masking signals Oi and Oi+1 is that of FIG. 4. This is a leading-edge detector whose principle and description are explained below.

The signal Ox is sent simultaneously to an inverter gate 11 and to the gate, the node E, of an N channel transistor 12. The source of the transistor 12 is grounded and its drain is connected to the source of an N channel transistor 13, which recovers the output of the inverter 11 at its gate. A capacitor 19 is also connected between the output, the node L, of the inverter 11 and ground.

The drain of the N channel transistor 13, the node F, is for its part connected simultaneously to an input of an inverter 14 and the output of a NAND gate 16. One of the inputs of the NAND gate 16 is the output, the node G, of the inverter 14. The inverter 14 is also connected to the gate of an N channel transistor 15. The source of this transistor 15 is grounded. Its drain, at the node H, is connected firstly to another input of the NAND gate 16, at this node H and secondly to an input, at the node I, of an inverter gate 18. The output signal Oi is recovered at the output of this inverter gate 18. There is also, mounted in a bypass connection, between the drain of the N channel transistor 15 and the inverter 18, a capacitor 20 connected to ground and a P channel transistor 17 whose gate is grounded and whose source is at Vcc.

If Ox is at 0, the inverter 11 makes the signal go to 1, at the node L. The N channel transistor 12 is off. The transistor 13, at the outset, has its gate at 5 volts. The signal at the node F is therefore at 1. Hence, after the inverter 14, the signal at the node G is at 0. The node I is at 1 because the N channel transistor 15 is off. There is, therefore, a 1 at the output of the NAND gate 16, at the node F. Furthermore, 0 is obtained at the node J at output of the inverter 18. For Oi, the low level of Ox is seen again.

At the appearance of a leading edge of Ox (Ox goes to 1), 1 is immediately found at E. The transistor 12 is then saturated and dictates a state 0 at K, the intermediate node between the transistor 12 and the transistor 13.

For a short period, related to the time of propagation of the signal in the inverter 11 and the slowness of this propagation, due to the presence of the capacitor 19, the signal at the node L will be at 1 at the same time as K. The two transistors 12 and 13 are then on at the same time and prompt a state 0 in F. This leads to a state 1 in G. The transistor 15 is then on. Since the N channel transistor 15 is fairly powerful, it counters the precharging of the P channel transistor 17. In practice, the transistor 15 is a larger transistor than the transistor 17. In normal bias, it is capable of letting through much more current than the transistor 17, for example, ten times more current. The potential at I goes to 0 for a short duration. There is, therefore, a brief inflection of the signal at I. Hence, at the output from the inverter gate 18, the potential at J is temporarily at 1. Hence Oi has a short pulse. During this time, the potential at L goes to 0. We therefore have 1 at node F. The NAND gate 16 therefore becomes conductive again and a stable state is found, namely the state that existed when Ox was at 0.

Thus, there is produced a signal Oi whose pulse has a shorter duration than Ox. This signal Oi reproduces the leading transitions of Ox and remains in a high state for a short instant. The duration of the high state is determined essentially by the time of propagation of the signal in the part of the circuit provided by the inverter 11 and the capacitor 19.

It must be noted that, for a trailing edge, nothing is detected at the output of the circuit. The two N channel transistors 12 and 13 are always off (with the potential at node F being at 1). However, it will be easy to make a low transition detector either by adding an inverter at the input of the circuit of FIG. 4, or by replacing the two N channel transistors 12 and 13 by P channel transistors.

What is claimed is:

1. An electronic integrated circuit comprising:
    a charge pump;
    at least one first oscillator to produce cyclically repetitive pulses for use as control signals for said charge pump; and
    a masking circuit to mask transmission of certain ones of the cyclically repetitive pulses from said at least one first oscillator to said charge pump to modify a frequency of electromagnetic radiation resulting from the cyclically repetitive pulses.

2. A circuit according to claim 1, wherein said at least one first oscillator comprises a ring oscillator.

3. A circuit according to claim 1, wherein said masking circuit comprises at least one second oscillator having an output connected with an output of said first oscillator.

4. A circuit according to claim 3, wherein said at least one second oscillator has a frequency lower than a frequency of said at least one first oscillator.

5. A circuit according to claim 3, wherein said masking circuit further comprises a combination circuit to combine signals of the at least one first oscillator and the at least one second oscillator.

6. A circuit according to claim 5, wherein said combination circuit comprises at least one NOR gate.

7. A circuit according to claim 3, wherein said at least one second oscillator produces a signal having a duty cycle ratio smaller than a duty cycle ratio of a signal produced by said at least one first oscillator.

8. A circuit according to claim 3, wherein said at least one second oscillator comprises:
    a second oscillator; and
    a third oscillator phase-shifted with respect to said second oscillator.

9. A circuit according to claim 3, wherein said at least one second oscillator comprises a circuit to produce a pulse with a duration shorter than a duration of a pulse of said at least one second oscillator at a time of appearance of an edge of a pulse of said at least one second oscillator.

10. A circuit according to claim 3, wherein said at least one second oscillator produces a signal having a duty cycle ratio in a range of about 10% to 15%.

11. A circuit according to claim 1, said at least one first oscillator produces a signal having a duty cycle ratio of about 50%.

12. An electronic circuit comprising:
    a charge pump;
    at least one first oscillator to produce cyclically repetitive pulses for use as control signals for said charge pump; and
    a masking circuit to mask transmission of pulses produced from said at least one first oscillator to said charge pump, said masking circuit comprising at least one second oscillator having an output connected with an output of said first oscillator and having a frequency lower than a frequency of said at least one first oscillator.

13. A circuit according to claim 12, wherein said at least one first oscillator comprises a ring oscillator.

14. A circuit according to claim 12, wherein said masking circuit further comprises a combination circuit to combine signals of the at least one first oscillator and the at least one second oscillator.

15. A circuit according to claim 14, wherein said combination circuit comprises at least one NOR gate.

16. A circuit according to claim 12, wherein said at least one second oscillator produces a signal having a duty cycle ratio smaller than a duty cycle ratio of a signal produced by said at least one first oscillator.

17. A circuit according to claim 12, wherein said at least one second oscillator comprises:
    a second oscillator; and a third oscillator phase-shifted with respect to said second oscillator.

18. A circuit according to claim 12, wherein said at least one second oscillator comprises a circuit to produce a pulse with a duration shorter than a duration of a pulse of said at least one second oscillator at a time of appearance of an edge of a pulse of said at least one second oscillator.

19. A circuit according to claim 12, wherein said at least one second oscillator produces a signal having a duty cycle ratio in a range of about 10% to 15%.

20. A circuit according to claim 12, said at least one first oscillator produces a signal having a duty cycle ratio of about 50%.

21. A method for operating an electronic circuit of a type comprising a charge pump to reduce electromagnetic radiation from the circuit, the method comprising the steps of:

producing cyclically repetitive pulses for use as control signals for the charge pump; and masking transmission of certain ones of the cyclically repetitive pulses to the charge pump.

22. A method according to claim 21, wherein the step of producing the cyclically repetitive pulses comprises producing same using at least one first oscillator.

23. A method according to claim 22, wherein the step of masking comprises the steps of:

using at least one second oscillator having a frequency lower than a frequency of the at least one first oscillator; and combining signals of the at least one first oscillator and the at least one second oscillator.

24. A method according to claim 23, wherein the step of combining comprises using at least one NOR gate.

25. A method according to claim 23, further comprising the step of operating the at least one second oscillator to produce a signal having a duty cycle ratio in a range of about 10% to 15%.

26. A method according to claim 23, further comprising the step of operating the at least one first oscillator to produce a signal having a duty cycle ratio of about 50%.

\* \* \* \* \*